Aug. 13, 1957     J. W. PARKER     2,802,605
DROPPER
Filed July 28, 1955.

INVENTOR
JOSEPH W. PARKER
BY
ATTORNEY

United States Patent Office 2,802,605
Patented Aug. 13, 1957

2,802,605

DROPPER

Joseph W. Parker, Baltimore, Md., assignor to Pharma Plastics Incorporated, a corporation of Maryland Application July 28, 1955, Serial No. 524,871

8 Claims. (Cl. 222—215)

This invention relates to droppers of the type commonly employed in dispensing medicines and represents a vast improvement over devices for this purpose heretofore proposed. In the first place, the dropper contemplated herein is molded from one piece of thermoplastic material such as polyethylene, eliminating the usual frangible glass component as well as the rubber or other elastomeric component which has been found to be incompatible with a number of medicines.

Moreover, since the dropper herein proposed can have integral seals and closures combined therewith, substantial savings in assembly and other manufacturing processes are realized.

It is among the objects of this invention to provide a dropper comprising a body of flexible thermoplastic material defining a pipette of relatively small diameter having an open end and a bulb of larger diameter integral therewith an having a closed end. The closed end is preferably flattened and heat sealed in a separate operation subsequent to the molding step. Polyethylene has been eminently satisfactory as the thermoplastic material since it is compatible with so many of the materials commonly dispensed with droppers of this type.

The dropper may have an integral radial flange intermediate its length to serve as a liner or closure for a bottle or other container and the flange is preferably coaxial with the pipette. Such an integral closure may assume the form of a plug or a cap, threaded or otherwise for engagement with the container to be closed.

A more complete understanding of the invention will follow from a detailed description of the accompanying drawings wherein.

Figure 1:
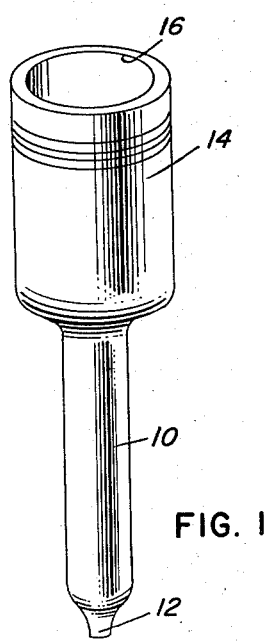
Fig. 1 is a perspective view of a partially completed dropper according to the present invention.
Figure 2:
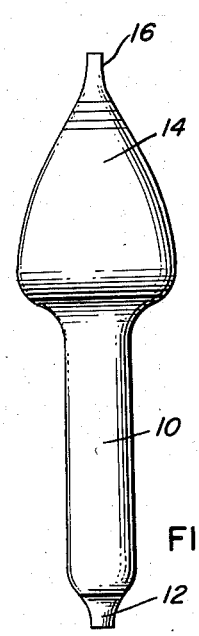
Fig. 2 is an elevation of the dropper of Fig. 1 after it has been completed.

The dropper as depicted in the drawing comprises a lower portion defining a pipette 10 having a reduced open end 12 for reception and delivery of the material to be dispensed, and an upper portion defining a bulb 14 whose upper end 16 is initially open as depicted in Fig. 1 and subsequently flattened and heat sealed as shown in Fig. 2. Whereas various flexible thermoplastic materials are contemplated, polyethylene has been found to be eminently satisfactory as the composition from which to produce the dropper of the present application. It will be evident that the relatively small diameter of the pipette portion of the dropper is relatively self supporting whereas the larger diameter bulb portion is readily collapsible under the force applied by the thumb and forefinger of the user.

Figure 3:
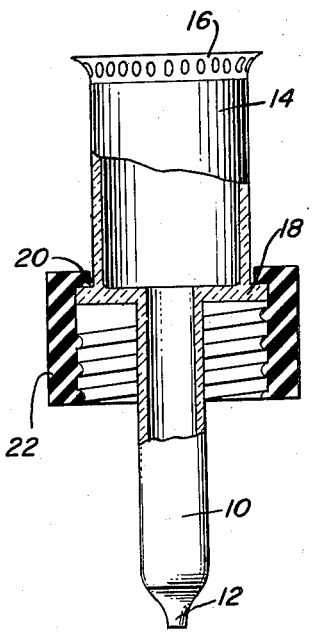
Fig. 3 is an elevation partially in section of a dropper having an integral intermediate flange in association with an internally threaded bottle cap.

The form of the invention depicted in Fig. 3 includes an integral intermediate flange 18 projecting radially beyond the base of the bulb 14 to define a seat for the inwardly directed flange 20 of an internally threaded screw cap 22. It will follow that the lower surface of the flange 18 will be received across the mouth of a container to be sealed so that when the cap 22 is applied, a seal will be achieved by the flange of the dropper with which it is unitary.

Figure 4:
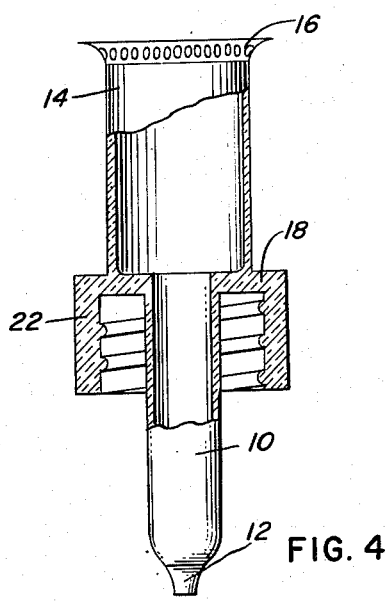
Fig. 4 is an elevation partially in section of a dropper having an internally threaded bottle cap integral therewith.

In Fig. 4, the internally threaded cap 22 is itself integral with the dropper even further simplifying assembly with a container to be sealed. It will be noted from the drawing that the pipette, bulb and cap are homogeneous and integral.

Figure 5:
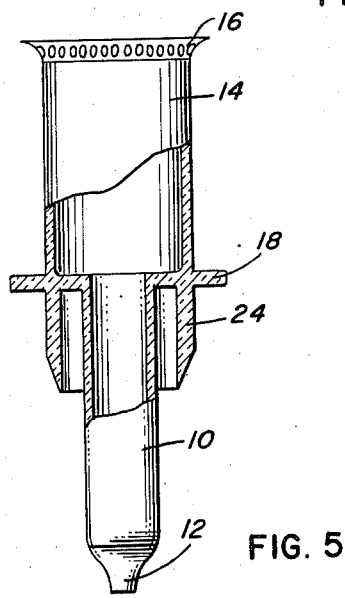
Fig. 5 is an elevation partially in section of a dropper having a plug type of closure integral therewith.

The form of the invention depicted in Fig. 5 includes a skirt 24 depending from the intermediate flange 18 to define a plug for reception within the mouth of a container to be sealed. In this event, the lower surface of the flange 18 projecting radially beyond the skirt 24 can engage the upper surface of the container to be sealed to serve as a stop.

Regardless of the form assumed by the dropper, it is preferable to mold all of the parts that are to be integral with the upper end of the bulb portion left open as depicted in Fig. 1. Then, after removal of the integral structure from the mold, the upper edge of the bulb will be flattened, as shown in Fig. 2, and heat sealed with conventional equipment for the purpose. This method is applicable to each of the forms of the invention depicted in the drawings as well as to other modifications that will suggest themselves to those skilled in the art.

As illustrated best in Fig. 4, the wall of the pipette 10 may be thicker than that of the bulb 14, so that the pipette will resist undue deformation while the bulb will be rather readily deformable. A pipette wall thickness of 0.030 inch and a bulb wall thickness of 0.022 inch have been highly satisfactory in the production of polyethylene droppers according to this invention.

The modifications shown and described herein will illustrate the invention but should not be restrictive thereof beyond the scope of the appended claims.

I claim:

1. A dropper comprising a body of flexible thermoplastic material defining a pipette of relatively small diameter having an open end and a bulb of larger diameter integral therewith terminating in a fused flat closed end.

2. A dropper as set forth in claim 1 wherein said thermoplasic material is polyethylene.

3. A dropper as set forth in claim 1 wherein said dropper has an integral radial flange intermediate its length and having a diameter exceeding that of said bulb.

4. A dropper as set forth in claim 3 wherein said flange is coaxial with said pipette.

5. A dropper as set forth in claim 1 wherein said dropper carries an integral annular container closure intermediate its length and coaxial with said pipette.

6. A dropper as set forth in claim 5 wherein said closure is a plug.

7. A dropper as set forth in claim 5 wherein said closure is a cap.

8. A dropper as set forth in claim 7 wherein said cap is internally threaded.

References Cited in the file of this patent

UNITED STATES PATENTS

| 1,845,698 | Birrell | Feb. 16, 1932 |
| 2,651,437 | Fields | Sept. 8, 1932 |
| 2,724,863 | Gudge et al. | Nov. 29, 1955 |